(12) United States Patent
Fuji

(10) Patent No.: US 8,330,858 B2
(45) Date of Patent: *Dec. 11, 2012

(54) PULL-DOWN DETECTION APPARATUS AND PULL-DOWN DETECTION METHOD

(75) Inventor: Kazuhiro Fuji, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,644

(22) Filed: Mar. 15, 2012

(65) Prior Publication Data

US 2012/0176539 A1  Jul. 12, 2012

Related U.S. Application Data

(63) Continuation of application No. 11/350,890, filed on Feb. 10, 2006, now Pat. No. 8,189,103.

(30) Foreign Application Priority Data

Feb. 22, 2005 (JP) ................................. 2005-045480

(51) Int. Cl.
*H04N 7/01* (2006.01)
(52) U.S. Cl. ........................................................ 348/448
(58) Field of Classification Search .................... 348/97, 348/441, 446, 448, 449, 452, 700, 701
See application file for complete search history.

(56) References Cited

U.S. PATENT DOCUMENTS 5,689,301 A  11/1997 Christopher et al.
6,236,806 B1  5/2001 Kojima et al.
8,189,103 B2 *  5/2012 Fuji ............................... 348/448
2002/0149703 A1  10/2002 Adams et al.
2005/0078213 A1  4/2005 Sumiyoshi et al.
2005/0128360 A1  6/2005 Lu
2005/0168653 A1  8/2005 Wyman
2006/0187301 A1  8/2006 Fuji
2006/0187341 A1  8/2006 Fuji

FOREIGN PATENT DOCUMENTS

| JP | 10-145779 | 5/1998 |
| JP | 2001-197363 | 7/2001 |
| JP | 2003-153077 | 5/2003 |
| JP | 2003-284065 A | 10/2003 |

(Continued)

OTHER PUBLICATIONS

Office Action dated Jul. 21, 2010 for U.S. Appl. No. 11/349,904.

(Continued)

*Primary Examiner* — Timothy J Henn
(74) *Attorney, Agent, or Firm* — McGinn IP Law Group, PLLC

(57) ABSTRACT

A pull-down detection apparatus includes a pixel comparator at least performing pixel comparison between a subsequent field and a present field to determine a presence of a pixel change between the subsequent field and the present field, a field comparator compiles a determination result in the pixel comparator by dividing the result according to pixel location in the fields and determining a presence of an image change between the subsequent field and the present field based on the divided compiled determination result, and a pull-down determinater determining that the input video signal is generated by pull-down processing based on a history of a determination result in the field comparator.

18 Claims, 12 Drawing Sheets

FOREIGN PATENT DOCUMENTS

| | | |
|---|---|---|
| JP | 2004-201010 A | 7/2004 |
| JP | 2004-242196 | 8/2004 |
| JP | 2004-343333 | 12/2004 |
| JP | 2005-045470 | 2/2005 |
| KR | 2004-19282 | 3/2004 |
| TW | 1225365 | 12/2004 |
| WO | WO 03/039148 | 5/2003 |
| WO | WO 03/084227 A1 | 10/2003 |
| WO | WO 03/088641 A2 | 10/2003 |

OTHER PUBLICATIONS

Japanese Office Action dated Dec. 14, 2010 (with partial English translation).
U.S. Appl. No. 11/350,892, filed Feb. 10, 2006.
U.S. Appl. No. 11/349,904, filed Feb. 9, 2006.
Korean Office Action dated Dec. 13, 2006 (with partial English translation).
Taiwan Office Action dated Aug. 19, 2009 (with partial English translation).

* cited by examiner

PULL-DOWN DETECTION APPARATUS AND PULL-DOWN DETECTION METHOD

This application is a Continuation Application of U.S. patent application Ser. No. 11/350,890, filed on Feb. 10, 2006, now U.S. Pat. No. 8,189,103, and which has a foreign priority date of Feb. 22, 2005.

BACKGROUND OF THE INVENTION

1. Field of the Invention

The present invention relates a pull-down detection apparatus and a pull-down detection method for detecting that an interlace video signal is generated by pull-down processing.

2. Description of Related Art

When converting commercial films recorded at 24 frames/second into a NTSC video signal at 60 fields/second, 2-3 pull-down processing that creates 5 fields from 2 frames of an original image is performed. When converting commercial films recorded at 24 frames/second into a PAL video signal at 50 fields/second and when converting commercial films recorded at 30 frames/second into a NTSC video signal at 60 fields/second, 2-2 pull-down processing that creates 2 fields from 1 frame of an original image is performed.

On the other hand, when displaying interlace video signals such as the NTSC signal at 60 fields/second and the PAL signal at 50 fields/second, interlace/progressive conversion (hereinafter referred to as the IP conversion) that converts the interlace video signal into a progressive video signal is required. The IP conversion generates a missing line of the interlace video signal to obtain a progressive signal.

In the IP conversion, a method for creating pixel data of a missing line involves intra-field interpolation and inter-field interpolation. The intra-field interpolation interpolates the pixel data of a missing line from the pixel data of two lines adjacent to the missing line. The inter-field interpolation interpolates the pixel data of a missing line from the pixel data of the lines of two successive fields.

However, performing the IP conversion by the intra-field interpolation on the interlace signal generated by pull-down processing such as the 2-2 pull-down processing, which is referred to hereinafter as the pull-down signal, causes an obtained frame signal to have a lower vertical resolution than an original image before the pull-down conversion. Further, in the case of the inter-field interpolation, generating a frame signal using two fields created from different frames causes deterioration in image quality due to comb noise or the like.

In order to avoid the image quality deterioration, when performing the IP conversion on the interlace signal generated by the pull-down processing, it is preferred to create a frame signal by combining two field signals that are generated from the same frame. This allows preventing the image quality deterioration. Performing the IP conversion by using the regularity of the pull-down signal is called reverse pull-down processing.

FIG. 11 shows an example of the reverse 2-2 pull-down processing. FIG. 11 illustrates the 2-2 pull-down processing for obtaining a field signal at 60I (60 fields/second) from a frame signal at 30P (30 frames/second) and the reverse 2-2 pull-down processing for obtaining a field signal at 60P (60 frames/second) from a frame signal at 60I (60 fields/second). For example, the 2-2 pull-down processing creates a field image 1T including odd lines of the frame 1 and a field image 1B including even lines of the frame 1 from a frame 1 at 30 P. On the other hand, the reverse 2-2 pull-down processing interpolates a missing line from the field images 1T and 1B that are created from the same frame to create two frames of a frame 1-1 and a frame 1-2. This is the same as in a frame 2 and subsequence frames.

Japanese Unexamined Patent Application Publication No. 2004-242196 describes the 2-2 pull-down detection apparatus that detects that an interlace video signal is a 2-2 pull-down signal and a progressive conversion apparatus that performs IP conversion by using 2 fields created from the same frame upon detection of the 2-2 pull-down signal. FIG. 10A shows an example of the 2-2 pull-down detection apparatus disclosed therein.

The 2-2 pull-down detection apparatus 90 of FIG. 10A includes a pixel difference comparator 91, a mismatched pixel number comparator 92 and a pull-down regularity detector 93.

The pixel difference comparator 91 calculates a difference between a pixel value of a pixel b1 of a present field signal b and a pixel value of a pixel a1 of a field signal a that is an immediately following field of the present field signal b and compares the difference with a threshold value as shown in FIG. 10B. The pixels a1 and b1 are located in the positions that are perceived as substantially the same on a screen. Specifically, the pixels a1 and b1 are at the same horizontal positions and the line containing the pixel b1 is placed adjacently under the line containing the pixel a1.

If the comparison result shows that the difference in pixel value between the pixel b1 and the pixel a1 is beyond a predetermined threshold value R1, a signal set to "1" indicating a change in pixel is supplied to the mismatched pixel number comparator 92. If, on the other hand, the difference is below the threshold value R1, a signal set to "0" indicating no change in pixel is supplied to the mismatched pixel number comparator 92.

The mismatched pixel number comparator 92 receives a signal supplied from the pixel difference comparator 91, counts the number of detections of a change in pixel value by the pixel difference comparator 91 for one field period and then compares the counted number at the end of the one field with the predetermined threshold value R2. If the counted value exceeds the threshold value R2, the mismatched pixel number comparator 92 supplies a signal set to "1" indicating that the field signal a and b are generated from different frames to the pull-down regularity detector 93. If, on the other hand, the counted value falls blow the threshold value R2, it supplies a signal set to "0" indicating that the field signal a and b are generated from the same frame to the pull-down regularity detector 93.

If the output signal from the mismatched pixel number comparator 92 has a pattern that 1 and 0 are repeated alternately like "1010..." or "0101...", the pull-down regularity detector 93 determines that there is a regularity of 2-2 pull-down signal. If, on the other hand, that repeated pattern of the output signal from the mismatched pixel number comparator 92 is lost, the pull-down regularity detector 93 determines that no regularity of 2-2 pull-down signal exists.

As described above, the pull-down detection apparatus determines if an image changes between adjacent fields and observes the regularity of the determination results, thereby detecting if it is a pull-down signal. Thus, for the accurate detection of the pull-down signal, it is necessary for the 2-2 pull-down detection apparatus 90 shown in FIG. 10A, for example, to perform accurate determination of a change in unit of pixels by the pixel difference comparator 91 and accurate determination of a change in units of fields by the mismatched pixel number comparator 92.

The conventional pull-down detection apparatus such as the 2-2 pull-down detection apparatus 90 shown in FIG. 10A determines if an image change exists by integrating the determination results of a pixel change in one entire screen. However, the integration of the determination results of a pixel change in one entire screen has the problem that the integration values are averaged in the entire screen.

For example, if an image has a moving portion only in a small part of the screen, the conventional pull-down detection apparatus is likely to wrongly determine that there is no image change since it determines if an image change exists based on the integration result of the entire screen and therefore the integration values are averaged in the entire screen.

In the image containing high-frequency component, the pixel comparator 12 is likely to wrongly determine an image change due to the presence of an edge portion. Thus, if the region containing the high-frequency component exists in the main area of the image, the conventional pull-down detection apparatus determines if an image change exists between the fields based on the integration value of the entire field that includes lots of wrong determination. Therefore, the conventional pull-down detection apparatus can wrongly determine that there is an image change in spite of no image change.

SUMMARY OF THE INVENTION

According to an aspect of the present invention, there is provided a pull-down detection apparatus for detecting that an input video signal is generated by pull-down processing, which includes a pixel comparator at least performing pixel comparison between a first field contained in the input video signal and a second field that is one-field before the first field and determining a difference in pixel between the first field and the second field, a field comparator compiles a determination result in the pixel comparator by dividing the result according to pixel location in the fields and determining a presence of an image change between the first field and the second field based on the divided compiled determination result, and a pull-down determiner determining that the input video signal is generated by pull-down processing based on a history of a determination result in the field comparator.

According to an aspect of the present invention, there is provided a pull-down detection method for detecting that a video signal is generated by pull-down processing, which includes measuring a difference in pixel between a first field contained in the video signal and a second field that is one-field before the first field and comparing the difference with a first threshold value, determining a presence of a pixel change between the first field and the second field based on a comparison result with the first threshold value, compiling determination results of a presence of a pixel change by dividing the results according to pixel location in the fields and determining a presence of an image change between the first field and the second field based on the divided and compiled determination result, and determining that the video signal is generated by pull-down processing based on a history of a determination result of a presence of an image change.

These configuration and method allow integrating the determination results on a pixel by dividing them into a plurality of regions. This enables the determination for each divided region, the determination by eliminating the region that causes wrong determination and so on. It is thereby possible to prevent wrong determination due to that the integration values are averaged in the entire screen and improve the detection accuracy of the pull-down signal.

The present invention allows providing a pull-down detection apparatus and a pull-down detection method with an improved accuracy of detecting a pull-down signal by preventing wrong determination due to that integration values of image change are averaged in the entire screen.

BRIEF DESCRIPTION OF THE DRAWINGS

The above and other objects, advantages and features of the present invention will be more apparent from the following description taken in conjunction with the accompanying drawings, in which.

DESCRIPTION OF THE EXEMPLARY EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A specific embodiment of the present invention is described hereinafter in detail with reference to the drawings. The following embodiment applies the present invention to a 2-2 pull-down detection apparatus for detecting a 2-2 pull-down signal and a progressive conversion apparatus for detecting the 2-2 pull-down signal and implements IP conversion.

Figure 1:
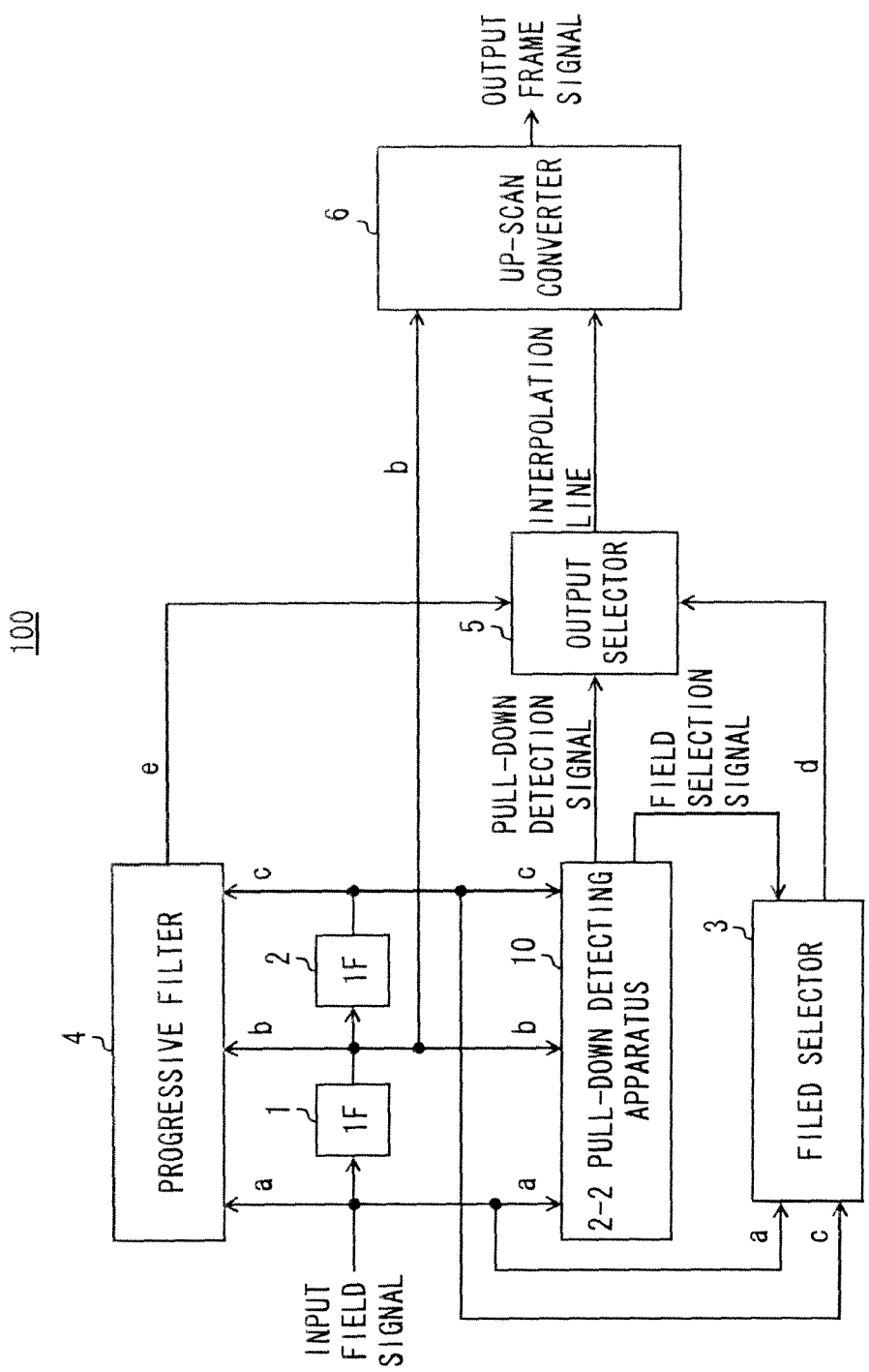
FIG. 1 is a block diagram of a progressive conversion apparatus according to an embodiment of the invention.

FIG. 1 shows the configuration of a progressive conversion apparatus 100 that includes a 2-2 pull-down detection apparatus 10 according to a first embodiment of the invention. In the progressive conversion apparatus 100, the elements different from the 2-2 pull-down detection apparatus 10 are the same as those in the conventional progressive conversion apparatus. The configuration of the progressive conversion apparatus 100 is described below.

Field delay circuits 1 and 2 are memories for delaying a field signal at 60 fields/second by one field period. As a result that the field delay circuits 1 and 2 delay the input field signal to the progressing conversion apparatus 100, a field signal a, an output signal b of the field delay circuit 1 and an output signal c of the field delay circuit 2 become three successive field signals. In the following description, the output signal b of the field delay circuit 1 is referred to as the present field signal, the field signal a that is one field after the present field signal b is referred to as a subsequent field signal, and the field signal c that is one field before the present field signal b is referred to as a previous field signal.

The 2-2 pull-down detection apparatus 10 determines if an input signal is a pull-down signal or not by comparing pixel values of pixels contained in the present field signal b, the subsequent field signal a, and the previous field signal c. If an input signal is a pull-down signal, the 2-2 pull-down detection apparatus 10 supplies a field selection signal to a field selector 3 so as to indicate a field used for interpolation of a missing line. The field selection signal is a signal for indicating the field that is created from the same frame as the present field signal b by the 2-2 pull-down processing is whether the subsequent field signal a and the previous field signal c.

The 2-2 pull-down detection apparatus 10 further supplies a pull-down detection signal to an output selector 5 so as to change the way of interpolating a missing line depending on whether an input field signal is a 2-2 pull-down signal or not. The configuration of the 2-2 pull-down detection apparatus 10 and the determination operation in the 2-2 pull-down detection apparatus 10 are detailed later.

The field selector 3 supplies the subsequent field signal a or the previous field signal c as an interpolation signal d according to the field selection signal output from the 2-2 pull-down detection apparatus 10.

A progressive filter 4 receives the present field signal b, the subsequent field signal a and the previous field signal c to detect a change in image. If a change in image is detected, it creates an interpolation line from the pixel of the present field signal b by the intra-field interpolation. On the other hand, if a change in image is not detected, it creates an interpolation line from the pixel of the present field signal b and the pixel of the subsequent field signal a by the inter-field interpolation. The progressive filter 4 supplies the created interpolation line as an interpolation signal e to the output selector 5.

The output selector 5 receives a pull-down detection signal output from the 2-2 pull-down detection apparatus 10. In the pull-down detection, the output selector 5 selects the interpolation signal d supplied from the field selector 3 and supplies it as an interpolation line signal to an up-scan converter 6. On the other hand, in no pull-down detection, the output selector 5 selects an interpolation signal e supplied from the progressive filter 4 and supplies it to the up-scan converter 6.

The up-scan converter 6 performs double-speed conversion of the present field signal b and the interpolation line signal output from the output selector 5 and combines the present field signal b and the interpolation line signal after the double-speed conversion to output a frame signal at 60 frames/second.

The configuration and operation of the 2-2 pull-down detection apparatus 10 are described hereinafter with reference to FIGS. 2 to 9.

Figure 2:
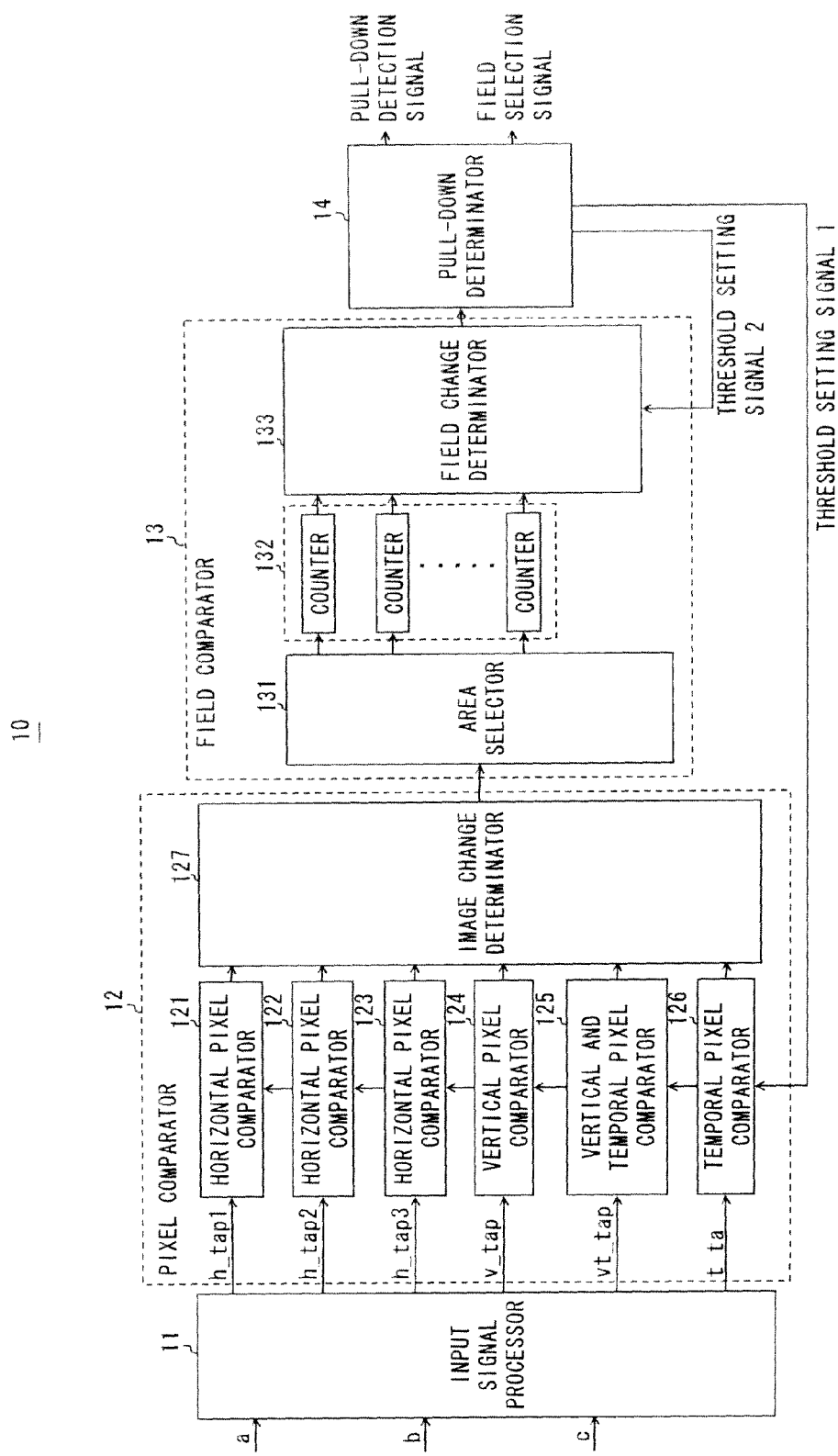
FIG. 2 is a block diagram of a 2-2 pull-down detection apparatus according to an embodiment of the invention.

FIG. 2 shows the configuration of the 2-2 pull-down detection apparatus 10. The 2-2 pull-down detection apparatus 10 includes an input signal processor 11, a pixel comparator 12, a field comparator 13 and a pull-down determinater 14. The entire operation of the 2-2 pull-down detection apparatus 10 is described herein with reference to the flowchart of FIG. 4.

Firstly, in Step S111, the input signal processor 11 receives the three successive field signals a, b and c and outputs signals to be used for the pixel comparator 12 to detect a change in pixel value: h_tap1, h_tap2, h_tap3, v_tap, vt_tap and t_tap.

Then, in Step S112, the pixel comparator 12 determines whether images are similar between the present field b and the subsequent field a for each pixel by using the signals output from the input signal processor 11.

In Step S113, the field comparator 13 compiles the determination results in the pixel comparator 12 in units of fields.

Then, the process repeats Steps S112 and S113 for the pixels of one field and, when the processing of one field ends, the field comparator 13 determines whether images are similar between the present field b and the subsequent field a based on the compiling results of one field (Steps S114 and S115).

In Step S116, the pull-down determinater 14 receives the determination results from the field comparator 13 and detects whether the determination results indicate the regularity of a pull-down signal. If the pull-down determinater 14 detects the regularity of a pull-down signal, it supplies a pull-down detection signal to the output selector 5 and also supplies a field selection signal to the field selector 3 (Steps S117 and S118). On the other hand, if the pull-down determinater 14 does not detect the regularity of a pull-down signal or if the regularity of a pull-down signal is broken, it releases the output of the pull-down detection signal to the output selector 5 (Step S119).

In Step S120, the pull-down determinater 14 determines whether to change a threshold value of the pixel comparator 12 and the field comparator 13 based on the history of the determination results in the field comparator 13. When the condition for threshold change is satisfied, the pull-down determinater 14 changes the threshold values of the pixel comparator 12 and the field comparator 13 or the threshold value of either one of them.

The components of the 2-2 pull-down detection apparatus 10 shown in FIG. 2 is described in detail below.

[Input Signal Processor 11]

The input signal processor 11 receives the three successive field signals a, b and c and outputs signals used for detecting a change in pixel value in the pixel comparator 12. Specifically, it supplies h_tap1, h_tap2 and h_tap3 that are used for detection of a change in pixel value in the horizontal direction, v_tap that is used for detection of a change in pixel value in the vertical direction, vt_tap that is used for detection of a change in pixel value in the vertical time direction, and t_tap that is used for detection of a change in pixel value in the time direction to the pixel comparator 12.

Figure 3A:
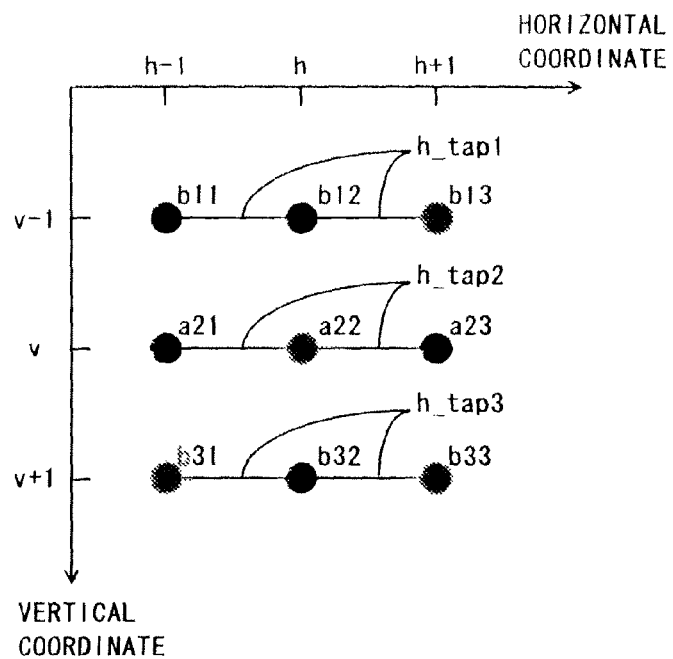
FIGS. 3A and 3B are views to describe a reference pixel in pull-down detection.
Figure 3B:
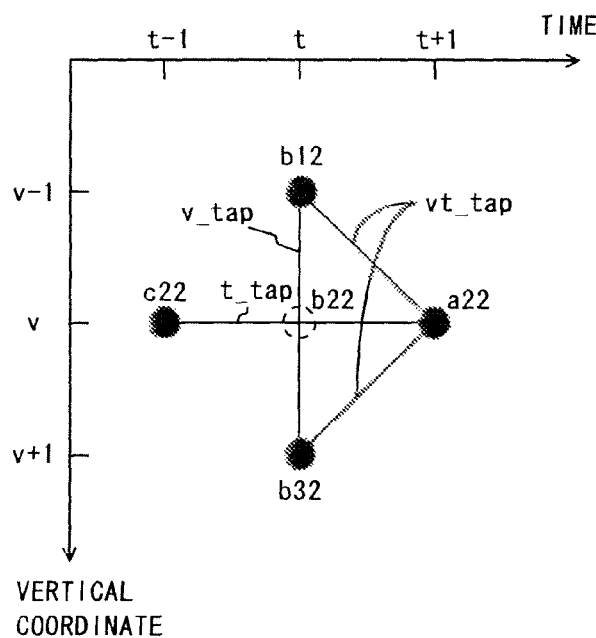
Figure 4:
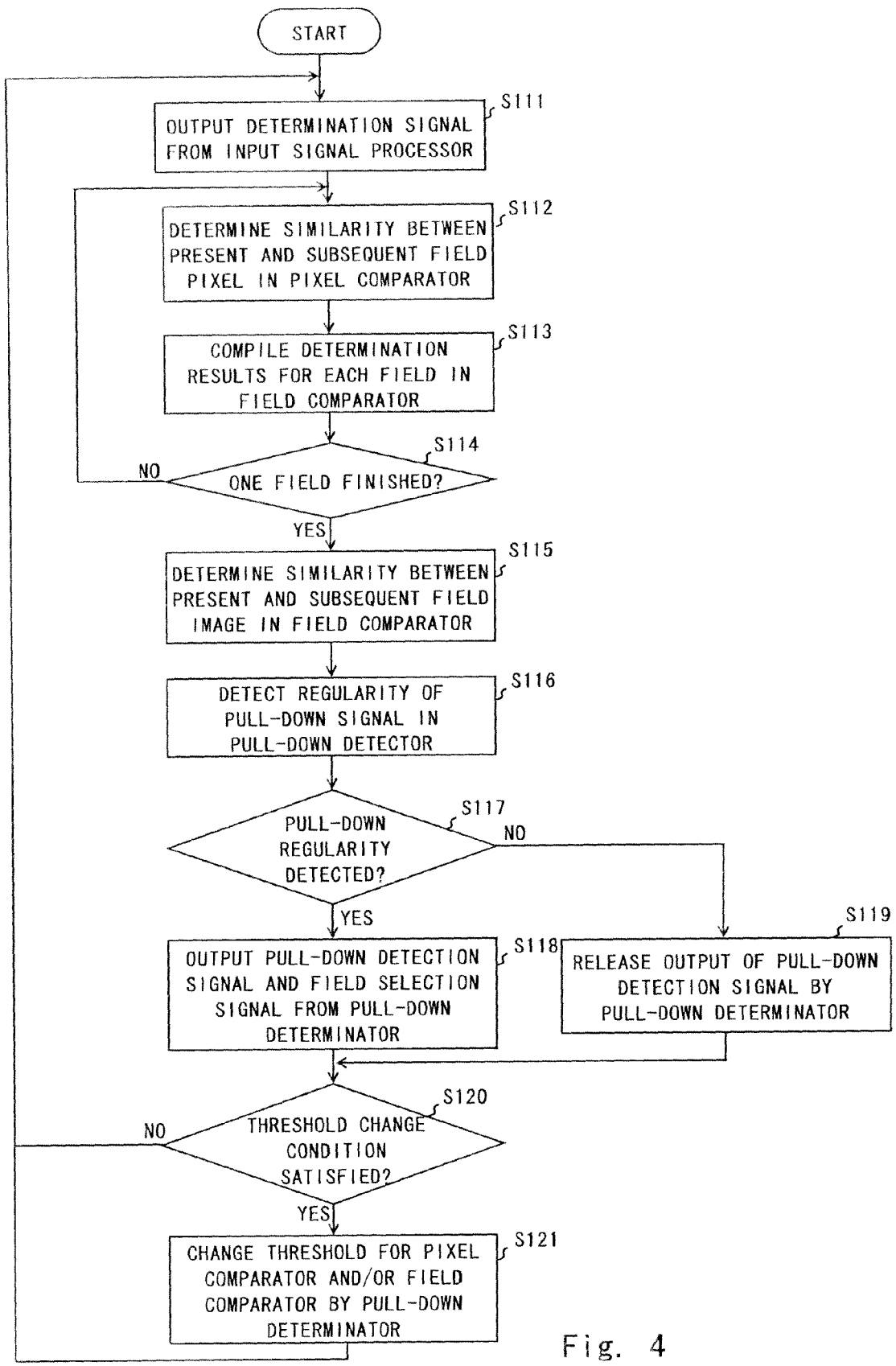
FIG. 4 is the operation flowchart of the 2-2 pull-down detection apparatus according to an embodiment of the invention.

The definitions of h_tap, v_tap, vt_tap and t_tap are described herein with reference to FIGS. 3A and 3B. h_tap contains pixel values of three pixels adjacent in the horizontal direction, which is three successive pixels in the same line. As shown in FIG. 3A, if the line for interpolation is v, h_tap1 contains pixel values of the three pixels b11, b12 and b13 included in the line v−1 that is immediately before the interpolation line v in the present field signal b. h_tap3 contains pixel values of the three pixels b31, b32 and b33 included in the line v+1 that is immediately after the interpolation line v in the present field signal b. h_tap2 contains pixel values of the three pixels b21, b22 and b23 included in the interpolation line v in the subsequence field signal a.

v_tap contains the pixel values of the pixels located adjacently over and under a pixel to be interpolated of the present field signal b. For example, if the pixel to be interpolated is b22 shown in FIG. 3B, v_tap contains the pixel values of b12 and b32.

vt_tap contains the pixel values of the pixels located adjacently over and under a pixel to be interpolated of the present field signal b and the pixel value of the pixel of the subsequent field signal a at the same coordinate as the pixel to be interpolated. For example, if the pixel to be interpolated is b22 shown in FIG. 3B, vt_tap contains the pixel values of b12, b32 and a22.

t_tap contains the pixel values of the pixels of the subsequent field signal a and the previous frame signal c that are located at the same coordinate as the pixel to be interpolated of the present field signal b. For example, if the pixel to be interpolated is b22 shown in FIG. 3B, t_tap contains the pixel values of a22 and c22.

Figure 5:
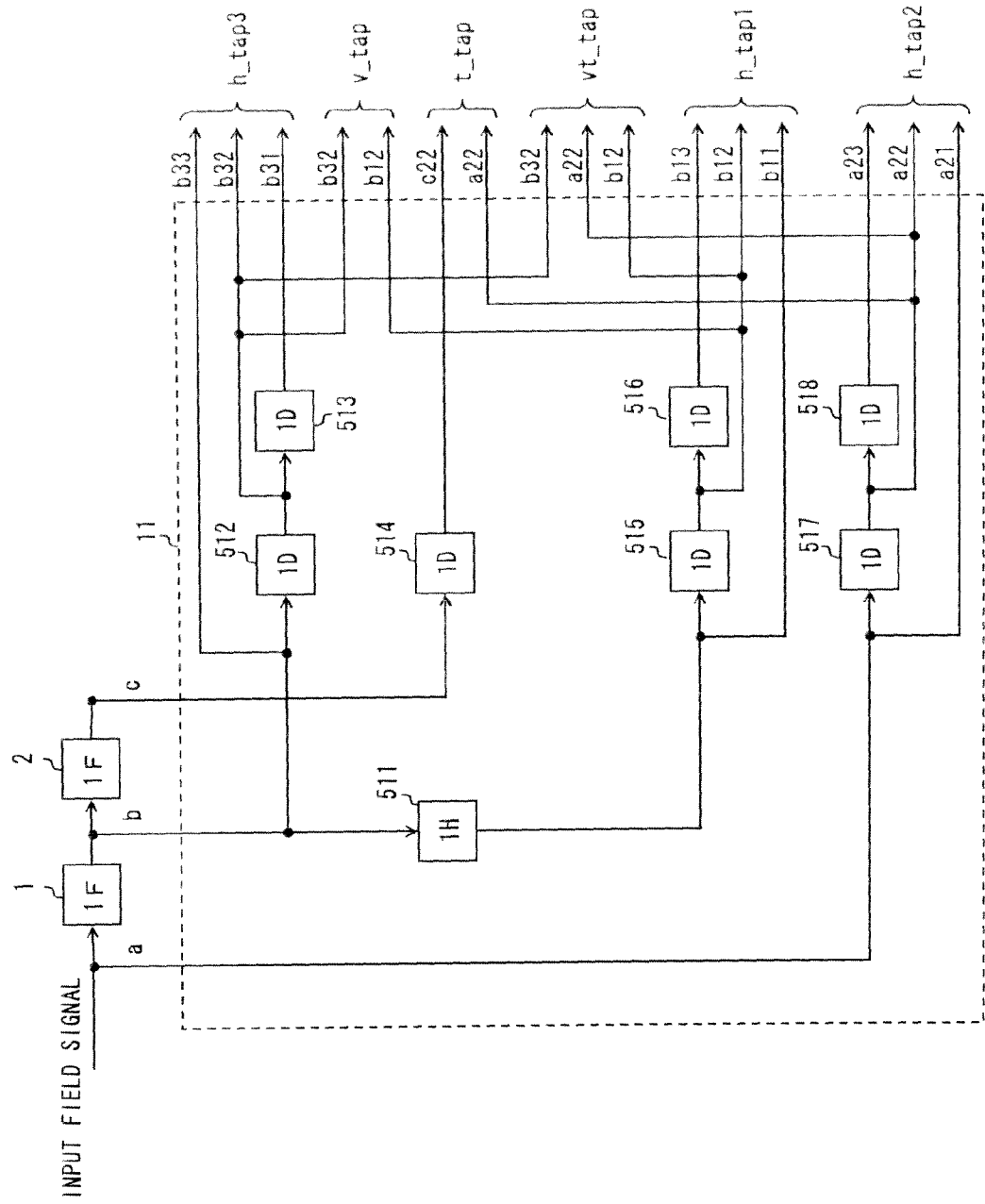
FIG. 5 is a block diagram showing the configuration example of an input signal processor.

FIG. 5 shows the configuration example of the input signal processor 11. A line delay circuit 511 is a memory that delays an input signal by one line (horizontal scan period). Dot delay circuits 512 to 518 are memories that delay an input signal by one dot period. A combination of the line delay circuit 511 and the dot delay circuits 512 to 518 produces h_tap1, h_tap2, h_tap3, v_tap, vt_tap and t_tap.

[Pixel Comparator 12]

The pixel comparator 12 determines if images are similar between the present field b and the subsequent field a in units of pixels by using h_tap1, h_tap2, h_tap3, v_tap, vt_tap and t_tap.

Horizontal pixel comparator 121 to 123 detect the presence of a change in images in the horizontal direction by using h_tap1, h_tap2 and h_tap3. A vertical pixel comparator 124 detects a change in images in the vertical direction by using v_tap. A vertical and temporal pixel comparator 125 detects a change in images between the present field b and the subsequent field a by using vt_tap. A temporal pixel comparator 126 detects a change in images between the previous field c and the subsequent field a by using t_tap.

An image change detector 127 determines if images are similar between the present field b and the subsequent field a, when focusing on a pixel a21 of the subsequent field a, based on the detection results in the horizontal pixel comparator 121 to 123, the vertical pixel comparator 124, the vertical and temporal pixel comparator 125 and the temporal pixel comparator 126.

Figure 10A:
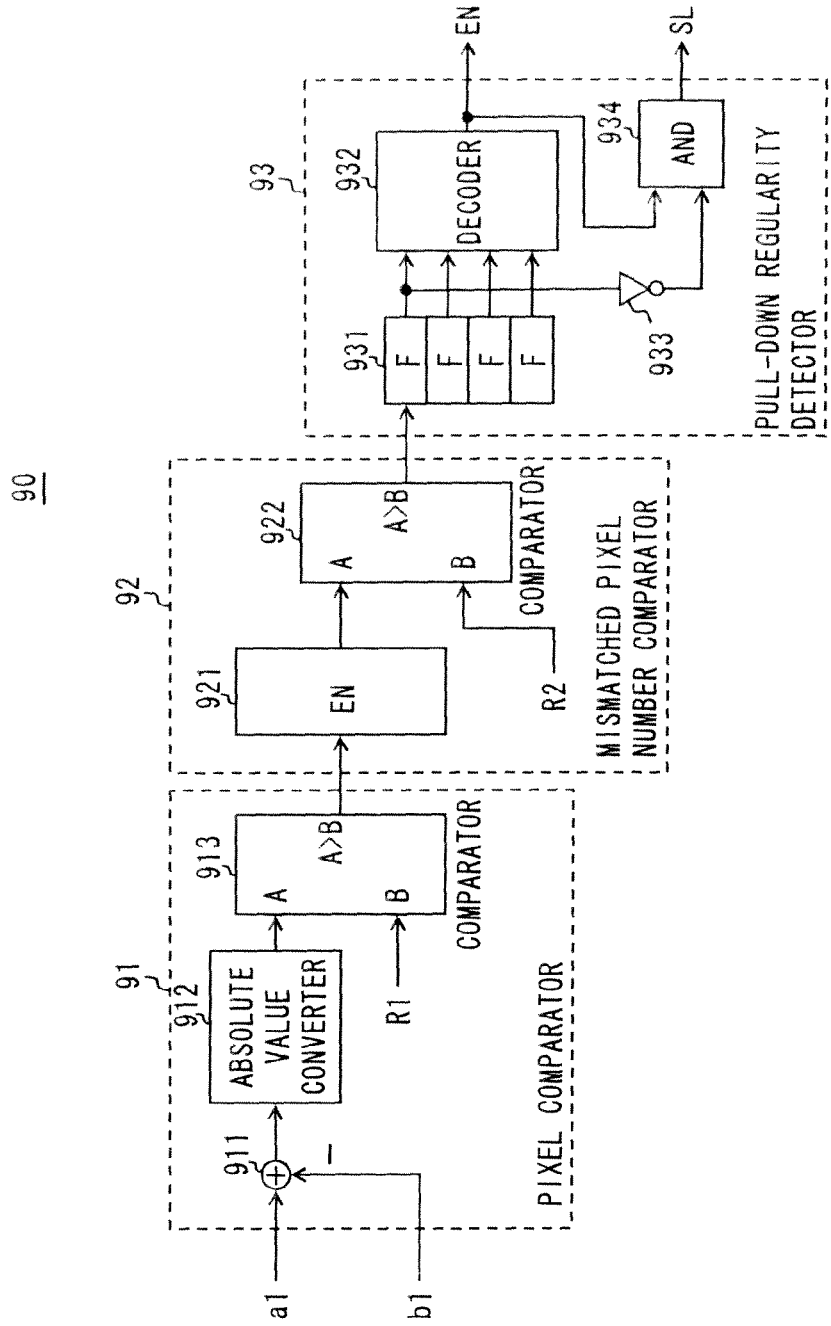
FIG. 10A is a block diagram of a conventional 2-2 pull-down detection apparatus.
Figure 10B:
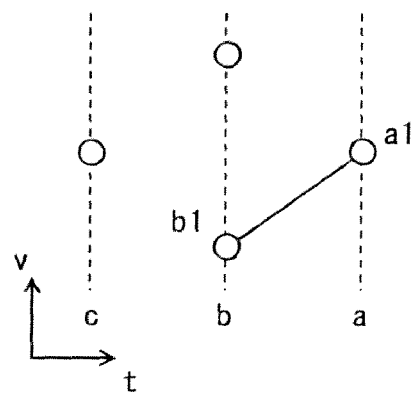
FIG. 10B is a view to describe a reference pixel in conventional pull-down detection.
Figure 11:
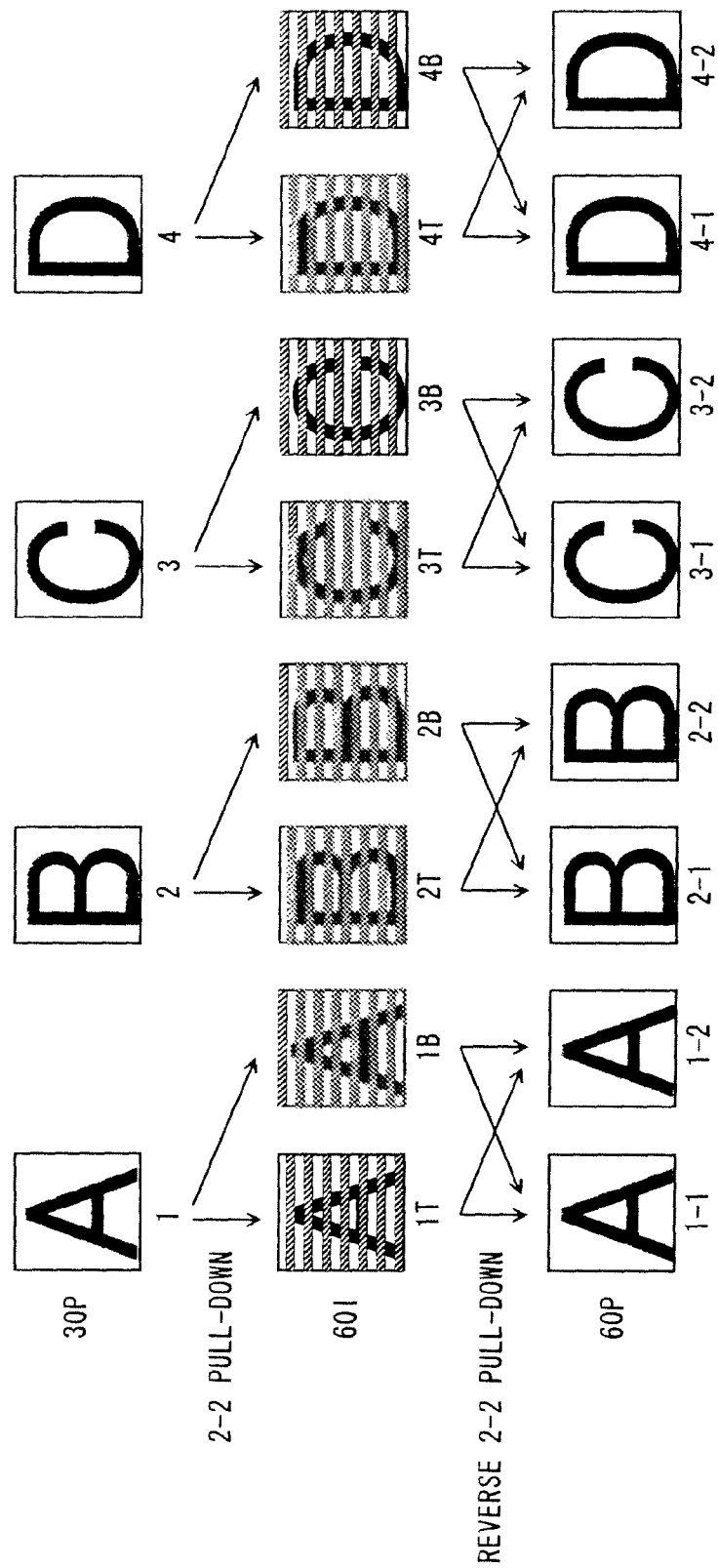
FIG. 11 is a view to describe reverse pull-down processing.

A conventional pull-down detecting apparatus such as the 2-2 pull-down detection apparatus 90 shown in FIG. 10A detects a change in images by comparing the pixels corresponding to vt_tap and v_tap. On the other hand, the 2-2 pull-down detecting apparatus 10 further performs the horizontal comparison and determination with use of h_tap1, h_tap2 and h_tap3 and the temporal comparison and determination with use of tap in addition to the comparison and determination with use of vt_tap and v_tap.

If a change in pixel value is large in the horizontal direction, it means that a display image includes high-frequency portion (hereinafter referred to as the edge portion) such as an oblique line and an object boundary. In such an edge portion, it is possible that an edge portion exists in the vertical direction as well. In this case, since a difference in pixel value occurs due to the presence of the edge portion, the determination on vt_tap in a conventional pull-down detecting apparatus is likely to wrongly determines that a image change occurs in spite that no image change occurs between the present field and the subsequent field.

Since the 2-2 pull-down detecting apparatus 10 performs the comparison and determination in the horizontal direction by using h_tap, it is possible to exclude the pixel whose pixel value largely changes in the horizontal direction from the pixels under determination. It is thereby possible to avoid wrong determination due to the presence of the edge portion and improve the determination accuracy of image change.

Further, the 2-2 pull-down detecting apparatus 10 performs the determination in the temporal direction by using t_tap. The advantage of implementing the determination with use of t_tap is as follows.

In a pixel where a change in pixel value is excessively large between the subsequent field a and the present field b, which is, where a temporal change is large, when the determination using vt_tap detects a change in pixel value, it is unable to determine if the change is due to a change in image between fields or due to the edge portion of a high-frequency image. If such a pixel is added to the determination of an image change, the wrong determination of image change is likely to occur even when the subsequent field a and the present field b are created from the same frame.

Since the 2-2 pull-down detecting apparatus 10 performs the temporal comparison and determination by using t_tap, it is possible to exclude the pixel whose pixel value largely changes in the temporal direction from the pixels under determination. It is thereby possible to avoid wrong determination on an image with a large temporal change and improve the determination accuracy of image change.

Meanwhile, if a change in pixel value is small between the subsequent field a and the previous field c, that is when a temporal image change is small, it is assumed that a change in pixel values between the subsequent field a and the present field b is also small. If such a pixel is added to the determination of an image change, it is difficult for the field comparator 13 to determine if images are similar even when the subsequent field a and the present field b are created from different frames.

To overcome the above drawback, the 2-2 pull-down detecting apparatus 10 can exclude the pixel where a temporal image change is small from the determination of similarity between images. It is thereby possible to improve the accuracy that the field comparator 13 determines if images are similar or not. Further, this elimination can avoid that the determination by using vt_tap determines that an image change exists in spite that an image change is small due to vertically high-frequency image and thus improves the accuracy of determining if images are similar.

Figure 6:
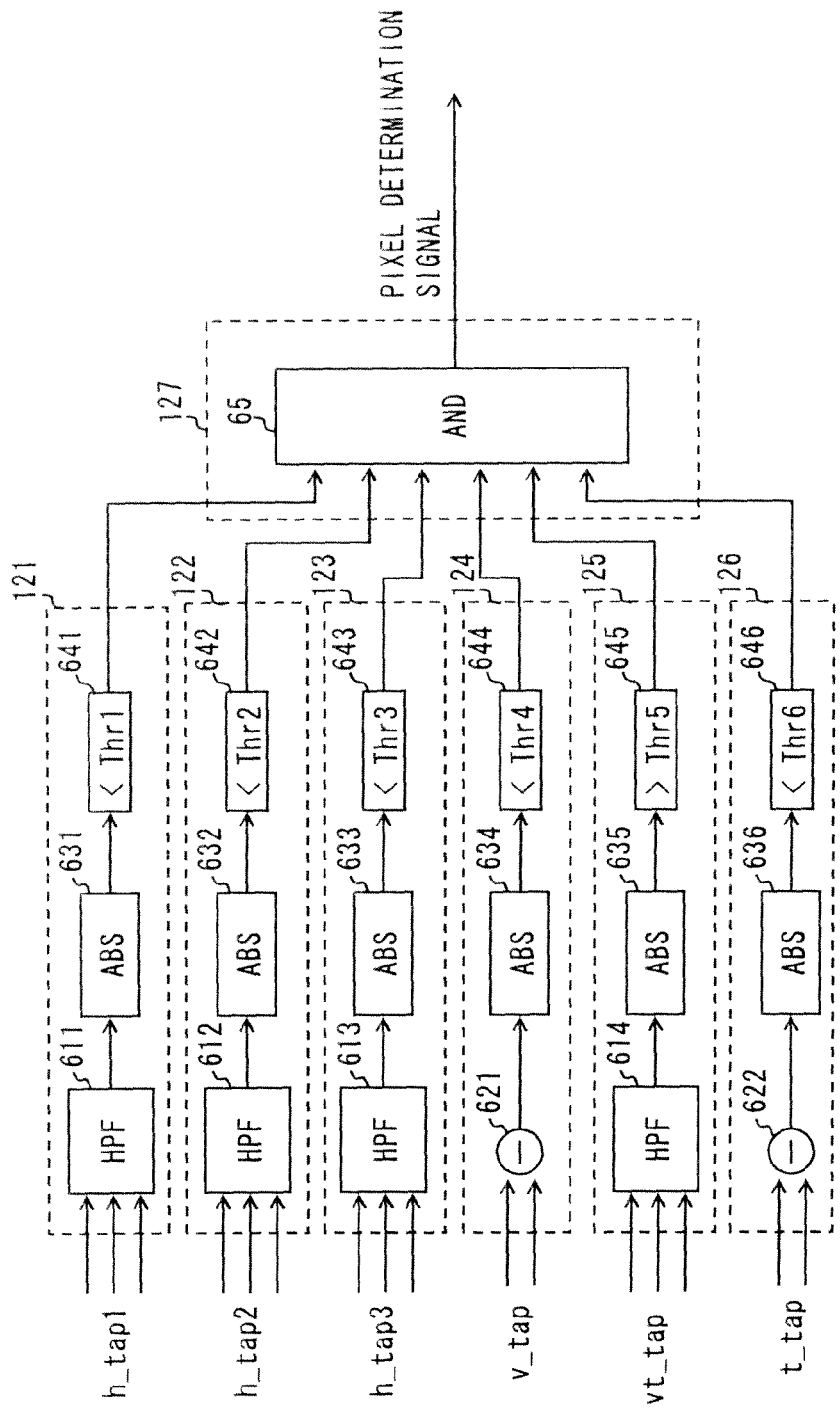
FIG. 6 is a block diagram showing the configuration example of a pixel comparator.

FIG. 6 shows the configuration example of the pixel comparator 12. HPF 611 to 614 are filters that implements calculation of (−1, 2, −1)/2 on three input signals. Subtractors 621 and 622 outputs a difference between two input signals. ABS 631 to 636 outputs an absolute value of an input signal. Threshold comparators 641 to 646 performs threshold determination on the signals supplied from the ABS 631 to 636, respectively, and outputs "1" if the determination result is true and "0" if the determination result is false.

The threshold comparator 641 that performs the threshold determination on h_tap1 outputs "1" if h_tap1 has a small change in pixel value in the horizontal direction and an input signal to the threshold comparator 641 is less than a threshold Thr1. On the contrary, the threshold comparator 641 outputs "0" if h_tap1 has a large change in pixel value in the horizontal direction and an input signal to the threshold comparator 641 is larger than the threshold Thr1. The operation of the threshold comparators 642 and 643 on h_tap2 and h_tap3, respectively, are the same as above. These determination operations allow eliminating a pixel where a change in pixel value in the horizontal direction is large from determination targets.

The threshold comparator 644 outputs "1" if v_tap has a small change in pixel in the vertical direction and an input signal to the threshold comparator 644 is less than a threshold Thr4 and outputs "0" if v_tap has a large change in pixel in the vertical direction and an input signal to the threshold comparator 644 is larger than the threshold Thr4.

The threshold comparator 645 outputs "1" if a difference between the pixel value of the pixel a22 of the subsequent field signal a and the pixel value of the pixel b12 and b32 of the present field signal b is large and an input signal to the threshold comparator 645 is larger than a threshold Thr5. On the contrary, it outputs "0" if a difference between the pixel value of the pixel a22 and the pixel value of the pixels b12 and b32 b is small and an input signal to the threshold comparator 645 is smaller than the threshold Thr5.

The threshold comparator 646 outputs "1" if t_tap has a small change in pixel in the temporal direction and an input signal to the threshold comparator 646 is less than a threshold Thr6 and outputs "0" if t_tap has a large change in pixel in the temporal direction and an input signal to the threshold comparator 646 is larger than the threshold Thr6. These determination operations allow eliminating a pixel where a temporal image change is large from the determination of an image change.

In FIG. 6, the image change detector 127 is composed of an AND circuit 65 that calculates a logical AND of binary signals output from the threshold determiner 641 to 646. The AND circuit 65 outputs "1" as a pixel determination signal when the determination results in the threshold determiners 641 to 646 are all true.

Though FIG. 6 shows the configuration example that sets a threshold value so that the threshold comparator 646 excludes a pixel where t_tap has an excessively large change in pixel in the temporal direction from the determination, the present invention is not limited thereto. In order to exclude the pixel where a temporal image change is small from determination of image change, the threshold comparator 646 may outputs "1" when an input signal to the threshold comparator 646 is equal to or larger than a threshold Thr6. Further, in order to exclude both of the pixel where a temporal change is excessively large and the pixel where a temporal image change is small from determination of image change, the threshold comparator 646 may have two threshold values.

[Field Comparator 13]

The field comparator 13 compiles the determination results in the pixel comparator 12 in units of fields and determines a change in the present field b and the subsequent field a based on the compiling result in each field. The field comparator 13 includes a plurality of counters and divides a screen into a plurality of regions and compiles the determination results in the pixel comparator 12 for each divided region.

A counter section 132 includes a plurality of counters. Each counter is allocated to each divided region of a screen. An area selector 131 receives a pixel determination signal output from the image comparator 12 and selects and outputs a counter in the counter section 132 based on a pixel coordinate. It is thereby possible to integrate the determination results in the pixel comparator 12 for each divided region.

The field change determiner 133 determines if the images are similar between the present field b and the subsequent field a based on the integration results of each divided region in the counter section 132. Specifically, it selects a divided region that is used for the determination of an image change between the fields, determines an image change of the selected divided region and, if an integration value that integrates the results in units of pixels exceeds a predetermined threshold value, determines that the images are not similar. Alternatively, it is feasible to determine if an integration value of a pixel change exceeds the threshold value for each divided region and, if an integration value of a pixel change exceeds a predetermined threshold value in any of region, determines that the images are not similar.

The conventional pull-down detection apparatus such as the 2-2 pull-down detection apparatus 90 shown in FIG. 10A determines if an image change exists by integrating the determination results of a pixel change in one entire screen. However, the integration of the determination results of a pixel change in one entire screen has the problem that the integration values are averaged in the entire screen.

For example, if an image has a moving portion only in a small part of the screen, the conventional pull-down detection apparatus is likely to wrongly determine that there is no image change since it determines if an image change exists based on the integration result of the entire screen and therefore the integration values are averaged in the entire screen. On the other hand, the 2-2 pull-down detection apparatus 10 determines if an integration value of a pixel change exceeds a threshold value for each divided region and detects an image change when an integration value in any of divided regions. It is thereby possible to avoid the wrong determination caused by that there is no change in a main region of an image.

In a region in the image containing high-frequency component, the pixel comparator 12 is likely to wrongly determine an image change due to the presence of an edge portion. Thus, if the region containing the high-frequency component exists in the main area of the image, the conventional pull-down detection apparatus determines if an image change exists between the fields based on the integration value of the entire field that includes lots of wrong determination. Therefore, the conventional pull-down detection apparatus wrongly determines that there is an image change in spite of no image change. On the other hand, the 2-2 pull-down detection apparatus 10 excludes the counter of the counter section 132 having a large integration value from the determination on image change and compares the integration values of the other counters with a predetermined threshold values so as to implement determination on image change by eliminating a region containing wrong determination due to the presence of an edge portion. It is thereby possible to avoid that the wrong determination in the pixel comparator 12 due to the presence of an edge portion affects the determination on image change between fields.

It is preferred to perform the selecting operation of the counter section 132 in the field comparator 13 in coordination with the determination in the horizontal direction using h_tap and the determination in the temporal direction using t_tap in the pixel comparator 12. For example, if the pixel comparator 12 is configured so as to exclude the pixel where a change in pixel value is large in the temporal direction from the determination target by the determination on t_tap as the configuration example in FIG. 6, the field comparator 13 is preferably configured so as to exclude the counter of the counter section 132 which has a large integration value from the determination on image change. This configuration can determine if a change exists between the present field b and the subsequent field a based on the integration result in the region where a pixel change in the temporal direction is not very large, which is the region where wrong determination in the pixel comparator 12 is not likely to occur. It is thereby possible to improve the accuracy of determining a field change in the field comparator 13.

Figure 7:
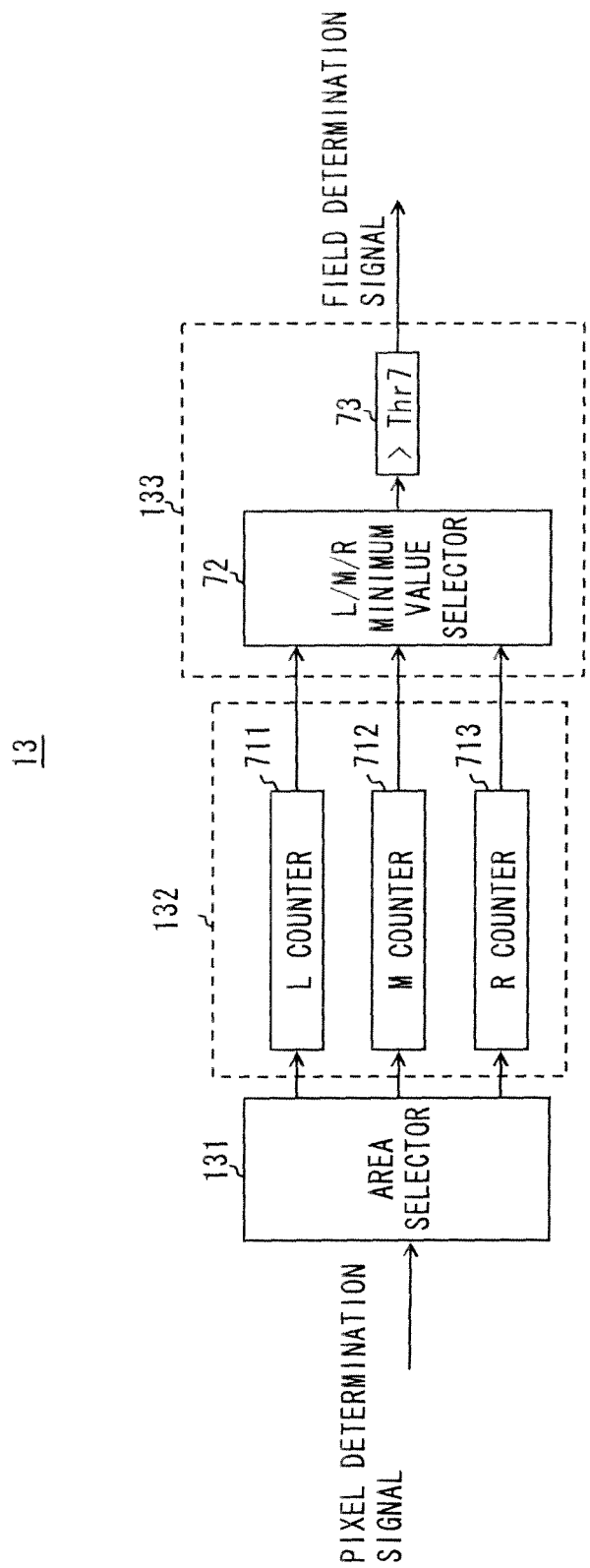
FIG. 7 is a block diagram showing the configuration example of a field comparator.

FIG. 7 shows the configuration example of the field comparator 13. FIG. 7 illustrates the case of horizontally dividing an image region into three regions. The counter section 132 includes an L counter 711 that compiles the determination results of the pixel comparator 12 on the pixels in the left-side region of an image, an M counter 712 that compiles the determination results in the middle region of an image, and an R counter 713 that compiles the determination results in the right-side region of an image.

FIG. 7 shows the case where the field change determiner 133 excludes the region where the integration value in the counter section 132 is large and detects a change in image based on the integration values in the other regions. An L/M/R minimum value selector 72 selects a minimum value from the integration values of the L counter 711, the M counter 712 and the R counter 713. A threshold comparator 73 compares the minimum value selected by the L/M/R minimum value selector 72 with a predetermined threshold Thr7. If the comparison with the threshold Thr7 results in satisfying the relationship of the minimum value>Thr7, it determines that the images are not similar and outputs "1" to the pull-down determinater 14. On the other hand, it the comparison results in satisfying the relationship of the minimum value<Thr7, it determines that the images are similar and outputs "0" to the pull-down determinater 14. The field determination signal is a 1-bit signal that is supplied to the pull-down determinater 14.

FIG. 7 shows the configuration that excludes the region where the integration value in the counter section 132 is large. To exclude the region where the integration value in the counter section 132 is small, the field change determinater 133 may select the counter having a large integration value.

Further, to determine if the integration value in pixel change exceeds a threshold value for each divided region, the L/M/R minimum value selector 72 may be excluded and the threshold comparator 73 may perform the threshold comparison on all the counters.

[Pull-Down Determinater 14]

The pull-down determinater 14 receives the field determination signal that is supplied from the field comparator 13 and determines if it has the regularity of the 2-2 pull-down signal. Specifically, if the input field determination signal has a pattern that 1 and 0 are repeated alternately like "1010 . . . " or "0101 . . . " in each field, the pull-down determinater 14 determines that there is the regularity of 2-2 pull-down signal. If, on the other hand, that repeated pattern of the field determination signal is lost, the pull-down determinater 14 determines that no regularity of 2-2 pull-down signal exists.

Further, if the pull-down determinater 14 detects the regularity of the pull-down signal, it supplies the pull-down detection signal to the output selector 5 and further supplies the field signal to the field selector 3 by determining if the present field signal b that is presently under processing is similar to the subsequent field signal a or the previous field signal c. The field selection signal indicates the subsequent field signal a or the previous field signal c as a field to create an interpolation line. Specifically, if the determination result of the immediately previous field determination signal is "1", the present field signal b and the subsequent field signal a are generated from the same frame, and since the determination result of the presently processed field signal is assumed to be "0" from the regularity of the pull-down signal, the field selection signal is set to indicate the subsequent field signal a. On the contrary, if the determination result of the immediately previous field determination signal is "0", the present field signal b and the subsequent field signal a are generated from difference frames, and since the determination result of the presently processed field signal is assumed to be "1" from the regularity of the pull-down signal, the field selection signal is set to indicate the previous field signal c.

On the other hand, if the pull-down determinater 14 does not detect the regularity of the pull-down signal, or the pull-down regularity is broken, it releases the output of the pull-down detection signal to the output selector 5.

Further, the pull-down determinater 14 determines whether to change the threshold values of the pixel comparator 12 and the field comparator 13 based on the history of the determination results of the above pull-down determination. When the condition for threshold change is satisfied, the pull-down determinater 14 changes the threshold values of the pixel comparator 12 and the field comparator 13 or the threshold value of either one of them.

In the conventional pull-down detection apparatus such as the 2-2 pull-down detection apparatus 90 shown in FIG. 10A, the threshold value that is used for determination on image change is fixed. If the threshold value for the determination is fixed, the determination is performed with the same threshold value even when the type of image is different such as a substantially static image and a largely moving image. Thus, if the set threshold value is not suited to the input field signal, it can cause the continuation of the state where the pull-down is not detected in spite of being a pull-down signal and the continuation of the state where the pull-down is detected due to failing to detect that the input field signal is not the pull-down signal. It further causes fluctuation to occur between the pull-down detection and non-detection. The occurrence of these things leads to deterioration of frame image quality after IP conversion.

On the other hand, the 2-2 pull-down detection apparatus 10 prevent that the above problematic state from continuing by setting a threshold value used for the determination on image change dynamically.

Figure 8:
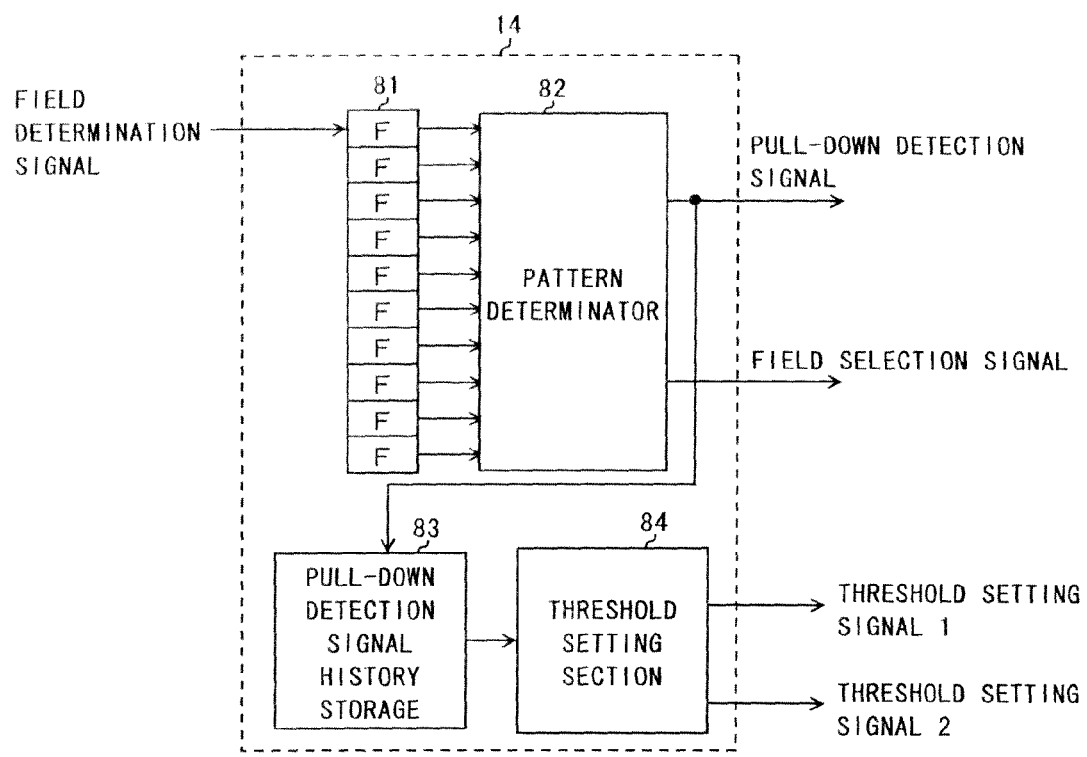
FIG. 8 is a block diagram showing the configuration example of a pull-down determiner.

FIG. 8 shows the configuration example of the pull-down determinater 14. A shift register 81 receives a field determination signal supplied from the field comparator 13 and accumulate the signal by performing shift operation once in each field, thereby retaining the history of the field determination. Though FIG. 8 shows the example where the number of stages of the shift register 81 is 10, it is not limited to this number. Since the fluctuation between the pull-down detection and non-detection is likely to occur if the number of stages of the shift register 81 is small, the detection accuracy increases as the number of stages is larger. However, since a larger number of fields are required until detecting the pull-down if the number of stages of the shift register 81 is larger, a delay time until entering the pull-down detecting state is longer. The actual number of stages is determined as a trade-off of these conflicting factors, and it is generally 4 stages to 10 stages.

The pattern determinater 82 acquires the stored value in the shift register 81 and determines if it matches with a pull-down pattern of "1010 . . . " or "0101 . . . ". If it matches with the pull-down pattern, the pattern determinater 82 supplies a pull-down detection signal to the output selector 5 and also supplies a field selection signal to the field selector 3. If it does not match with the pull-down pattern, the pattern determinater 82 releases the output of pull-down detection signal to the output selector 5.

The pull-down detection signal history storage 83 stores the history of the pull-down detection signal. The threshold setting section 84 determines whether to change the threshold values used for the threshold comparators 641 to 646 in the pixel comparator 12 and the threshold comparator 73 in the field comparator 13 and, if it determines to change the thresholds, outputs a threshold setting signal 1 and a threshold setting signal 2. It is preferred to implement the change of the threshold values in the case where (1) the state where pull-down is not detected continues for a long time, (2) the state where pull-down is detected continues for a long time, and (3) the state varies frequently between the pull-down detection and the pull-down non-detection.

(1) If the state where pull-down is not detected continues for a long time, the threshold value is changed gradually so as to make the pull-down detection easier. If the history of the pull-down detection signal keeps indicating "0" and image matching state continues, the threshold value is changed so as to facilitate detection of image change. For example, it is feasible to make changes such as gradually reducing the threshold Thr7 of the threshold comparator 72, gradually increasing the thresholds Thr1 to 3 of the threshold comparators 641 to 643, respectively, and so on. On the contrary, if the history of the pull-down detection signal keeps indicating "1" and the image changing state continues, it is feasible to change the threshold value so as to make a change to make the detection of image change harder.

If the input signal is a pull-down signal, this is detected and the IP conversion is implemented by using the interpolation signal output from the field selector 3, thereby producing a frame image without image quality deterioration. The 2-2 pull-down detecting apparatus 10 of this embodiment changes the threshold value so as to make the pull-down detection easier, thus improving the detection accuracy of the pull-down state.

(2) If the state where pull-down is detected continues for a long time, the threshold value is changed gradually so as to make the pull-down detection more difficult. For example, it is feasible to make a change of reducing the threshold Thr7 of the threshold comparator 72 gradually. Wrong detection of the image that is not the pull-down signal as the pull-down signal causes serious deterioration of image quality such as comb noise in the frame image output from the up-scan converter 6. The 2-2 pull-down detecting apparatus 10 of this embodiment prevents such serious image quality deterioration by making it easy to break away from the pull-down state.

(3) If the state varies frequently between the pull-down detection and the pull-down non-detection, the threshold value is changed temporarily to the value for not detecting the pull-down. If the state varies frequently between the pull-down detection and the pull-down non-detection, the frame image output from the up-scan converter 6 varies between the frame image after the IP conversion using the interpolation signal output from the field selector 3 and the frame image after the IP conversion using the interpolation signal generated by the progressive filter 4. Since these two frame images have different resolution, frequent switching causes deterioration of image quality such as flicker of the display image. The 2-2 pull-down detecting apparatus 10 of this embodiment prevents the image quality deterioration due to frequency variation of the state between the pull-down detection and the pull-down non-detection by changing the threshold values.

Figure 9:
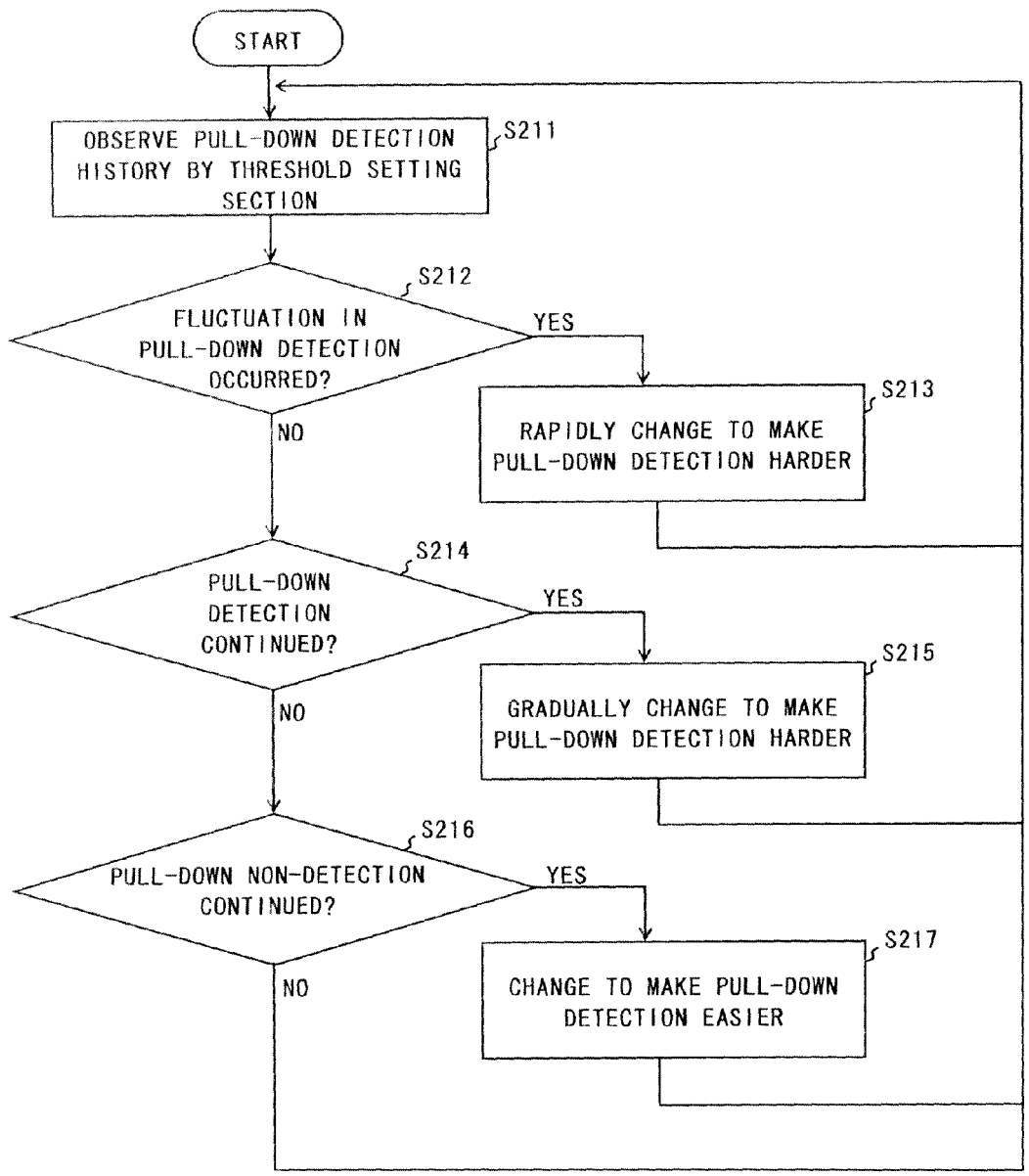
FIG. 9 is a flowchart of a threshold change operation in the pull-down determiner.

The threshold setting operation in the threshold setting section 84 is described hereinafter with reference to the flowchart of FIG. 9. Firstly, in Step S211, the threshold setting section 84 observes the history of the pull-down detection signal. If the frequency variation of the state between the pull-down detection and the pull-down non-detection is detected in Step S212, the threshold value is changed rapidly to the value where the pull-down detection is difficult in Step S213. Then, if the continuation of the pull-down detection state is detected in Step S214, the threshold value is changed gradually so as to make the pull-down detection more difficult in Step S215. If the continuation of the no pull-down detection state is detected in Step S216, the threshold value is changed so as to make the pull-down detection easier in Step S217.

The above embodiments describes the case where the present invention is applied to the 2-2 pull-down detection apparatus and the progressive conversion apparatus that detects a 2-2 pull-down signal and implements IP conversion. The present invention is also applicable to a 2-3 pull-down detection apparatus and a progressive conversion apparatus that detects a 2-3 pull-down signal and implements IP conversion in the same way as the apparatus for 2-2 pull-down detection.

It is apparent that the present invention is not limited to the above embodiment that may be modified and changed without departing from the scope and spirit of the invention.

What is claimed is:

1. A pull-down detection apparatus for detecting that an input video signal is generated by a pull-down processing, said pull-down detection apparatus comprising:
    a pixel comparator at least performing pixel comparison between a first field contained in the input video signal and a second field that is one-field before the first field and determining a presence of a pixel change between the first field and the second field;
    a field comparator compiling a determination result in the pixel comparator by dividing the result according to a pixel location in the fields, each said divided result being less than a complete field, selecting at least one of the divided and compiled determination results according to a predetermined rule, and determining a presence of an image change between the first field and the second field based on the selected at least one divided and compiled determination result; and
    a pull-down determiner determining that the input video signal is generated by pull-down processing based on a history of a determination result in the field comparator, and changing a condition for determining a presence of a pixel change in the pixel comparator based on a history of pull-down determination by the pull-down determiner.

2. The pull-down detection apparatus according to claim 1, wherein the field comparator compiles a number of pixels determined to be different between the first field and the second field in the pixel comparator by dividing them into a plurality of counters according to pixel location in the fields, and, if a minimum value of the number of pixels compiled in the plurality of counters, in view of said predetermined rule, exceeds a predetermined threshold value, determines that an image change exists between the first field and the second field.

3. The pull-down detection apparatus according to claim 1, wherein the field comparator compiles a number of pixels determined to be different between the first field and the second field in the pixel comparator by dividing them into a plurality of counters according to pixel location in the fields, and, if all of the number of pixels compiled in the plurality of counters, in view of said predetermined rule, exceed a predetermined threshold value, determines that an image change exists between the first field and the second field.

4. The pull-down detection apparatus according to claim 1, wherein the pixel comparator further performs a horizontal pixel comparison in the first field and/or the second field to determine a presence of a pixel change between the first field and the second field.

5. The pull-down detection apparatus according to claim 1, wherein the pixel comparator further compares pixels between the first field and a third field that is two-field before the first field to determine a presence of a pixel change between the first field and the second field.

6. The pull-down detection apparatus according to claim 1, wherein the pull-down determiner changes a condition for determining a presence of an image change in the field comparator based on a history of determination if the input video signal is generated by pull-down processing.

7. A pull-down detection method for detecting that a video signal is generated by a pull-down processing, said method comprising:
    measuring a difference in pixel between a first field contained in the video signal and a second field that is one-field before the first field and comparing the difference with a first threshold value;

determining a presence of a pixel change between the first field and the second field based on a comparison result with the first threshold value;

compiling determination results of a presence of a pixel change by dividing the results according to a pixel location in the fields, each said divided result being less than a complete field, selecting at least one of the divided and compiled determination results according to a predetermined rule, and determining a presence of an image change between the first field and the second field based on the selected at least one divided and compiled determination result;

determining that the video signal is generated by pull-down processing based on a history of a determination result of a presence of an image change; and changing a condition for said determining the presence of the pixel change based on a history of said determining that the video signal is generated by pull-down processing.

8. The pull-down detection method according to claim 7, comprising:

compiling determination results of a difference in pixel by dividing the results into a plurality of counters according to pixel location in the fields, and, if a minimum value of a number of pixels compiled in the plurality of counters, in view of said predetermined rule, exceeds a predetermined threshold value, determining that an image change exists between the first field and the second field.

9. The pull-down detection method according to claim 7, comprising:

compiling determination results of a difference in pixel by dividing the results into a plurality of counters according to pixel location in the fields, and, if all of a number of pixels compiled in the plurality of counters, in view of said predetermined rule, exceed a predetermined threshold value, determining that an image change exists between the first field and the second field.

10. The pull-down detection method according to claim 7, further comprising:

measuring a difference in pixel horizontally in the first field and/or the second field and comparing the difference with a second threshold value; and determining a presence of a pixel change between the first field and the second field based on a comparison result with the first threshold value and the second threshold value.

11. The pull-down detection method according to claim 7, further comprising:

measuring a difference in pixel between the first field and a third field that is two-field before the first field and comparing the difference with a second threshold value; and determining a presence of a pixel change between the first field and the second field based on a comparison result with the first threshold value and the second threshold value.

12. The pull-down detection method according to claim 7, wherein a condition for determining a presence of an image change between the first field and the second field is changed based on a history of determination if the video signal is generated by pull-down processing.

13. The pull-down detection apparatus of claim 1, wherein the predetermined rule is predetermined as detection regions of a field that potentially cause a wrong determination of pull-down detection, so that such regions can selectively be eliminated from the pull-down determination compiling processing.

14. The pull-down detection apparatus of claim 13, wherein the predetermined rule is directed to regions having a high frequency component due to a presence of an edge portion within the region.

15. The pull-down detection apparatus of claim 13, wherein the predetermined rule is directed to regions in which a pixel has a small difference between fields.

16. The pull-down detection method of claim 7, wherein the predetermined rule is predetermined as detection regions of a field that potentially cause a wrong determination of pull-down detection, so that such regions can selectively be eliminated from the pull-down determination compiling processing.

17. The pull-down detection method of claim 16, wherein the predetermined rule is directed to regions having a high frequency component due to a presence of an edge portion within the region.

18. The pull-down detection method of claim 16, wherein the predetermined rule is directed to regions in which a pixel has a small difference between fields.

* * * * *